United States Patent
Yamaguchi et al.

(10) Patent No.: US 9,358,977 B2
(45) Date of Patent: Jun. 7, 2016

(54) VEHICLE CONTROL APPARATUS

(71) Applicant: DENSO CORPORATION, Kariya, Aichi-pref. (JP)

(72) Inventors: Atsushi Yamaguchi, Nagoya (JP); Shingo Wanami, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/564,738

(22) Filed: Dec. 9, 2014

(65) Prior Publication Data

US 2015/0158488 A1    Jun. 11, 2015

(30) Foreign Application Priority Data

Dec. 11, 2013    (JP) ................................. 2013-256279

(51) Int. Cl.
  *B60W 30/08*    (2012.01)
  *B60W 10/18*    (2012.01)
  *B60W 30/095*   (2012.01)

(52) U.S. Cl.
  CPC ............... *B60W 30/08* (2013.01); *B60W 10/18* (2013.01); *B60W 30/0956* (2013.01)

(58) Field of Classification Search
  CPC .................................................... B60W 30/08
  USPC ............................................................ 701/1
  See application file for complete search history.

(56) References Cited

U.S. PATENT DOCUMENTS

| | | | | |
|---|---|---|---|---|
| 2008/0147277 | A1* | 6/2008 | Lu et al. ......................... | 701/45 |
| 2008/0269993 | A1* | 10/2008 | Simpson et al. ................ | 701/45 |
| 2009/0234543 | A1* | 9/2009 | Groitzsch et al. .............. | 701/45 |
| 2011/0022275 | A1* | 1/2011 | Oosaki ........................... | 701/45 |

FOREIGN PATENT DOCUMENTS

| | | |
|---|---|---|
| JP | 2001-101592 | 4/2001 |
| JP | 2005-138750 | 6/2005 |
| JP | 2005-199787 A | 7/2005 |
| JP | 2007-091102 | 4/2007 |
| JP | 2009-196463 | 9/2009 |
| JP | 2009-234452 | 10/2009 |
| JP | 2010-036648 | 2/2010 |
| JP | 2011-183882 | 9/2011 |
| JP | 2013-154760 | 8/2013 |

OTHER PUBLICATIONS

Office Action dated Sep. 24, 2015 in corresponding Japanese Application No. 2013-256279.

* cited by examiner

*Primary Examiner* — Rodney Butler
*Assistant Examiner* — Anne Mazzara
(74) *Attorney, Agent, or Firm* — Harness, Dickey & Pierce, P.L.C.

(57) ABSTRACT

A vehicle control apparatus includes one or more approach sensors, one or more collision detection sensors, an approach determination portion, a collision determination portion, and a braking determination portion. The approach determination portion determines whether a vehicle and an object are approached based on an output signal of one of the approach sensors, and generates a first information. The collision determination portion determines whether the vehicle collides with the object based on an output signal of at least one of the collision detection sensors, and generates a second information. The braking determination portion determines whether the vehicle is braked based on the first information and the second information.

14 Claims, 3 Drawing Sheets

VEHICLE CONTROL APPARATUS

CROSS REFERENCE TO RELATED APPLICATION

This application is based on Japanese Patent Application No. 2013-256279 filed on Dec. 11, 2013, the disclosure of which is incorporated herein by reference.

TECHNICAL FIELD

The present disclosure relates to a vehicle control device.

BACKGROUND ART

Patent Literature 1: JP-A-2001-101592

For example, patent literature 1 discloses a vehicle control apparatus that detects a moving body by a camera, determines a possibility of a collision between a vehicle and the moving body, and performs a collision avoidance control when there may be a possibility that a collision occurs.

A vehicle control apparatus that detects an object by an approach sensor during a low speed traveling is disclosed. Herein, the object represents a moving body such as a vulnerable road user or the like. The vehicle control apparatus determines that the object approaches a vehicle and executes a vehicle control when the two or more approach sensors detect the object at the same time. The approach sensor is disposed to each of right and left sides of a vehicle front part. A reliability of an approach determination may be secured by setting a condition that it is determined that the object approaches the vehicle when the two or more approach sensors detect the object.

The applicants of the present application have found the following. The vehicle control apparatus may detect the vulnerable road user with one approach sensor before a collision occurs in a case where the vulnerable road user blocks a movement direction of a vehicle for a short time (e.g. a jump out, a suddenly crossing a road, a suddenly coming out from a blind spot). However, it may be less likely that two approach sensors detect the vulnerable road user before the collision in this case. Therefore, since the one approach sensor detects the vulnerable road user, it may be possible to awake an attention such as a warning. A vehicle control such as an automatic brake may not be executed. Thus, in some cases, it may be difficult to prevent a run-over accident of the vulnerable road user after the vulnerable road user collides with the vehicle.

It may be considered that the number of arrangement of the approach sensor is increased or a sensitivity of the approach sensor is increased. In this case, the vehicle control apparatus may excessively detect things other than the vulnerable road user. The vehicle control such as an excessive alarm, an automatic brake, or the like may be performed even when the vehicle is in a normal driving state irrespective of the jump out or the like. Therefore, the excessive control according to an excessive detection may prevent a comfortable vehicle travelling. In other words, it may not be precisely determined whether the vehicle control is executed or not.

SUMMARY

It is an object of the present disclosure to provide a vehicle control apparatus that precisely determines whether the vehicle should be braked or not in order to prevent a run-over accident of a vulnerable road user even in a situation where it is difficult to detect an object such as a jump out of the vulnerable road user.

According to one aspect of the present disclosure, a vehicle control apparatus includes one or more approach sensors, one or more collision detection sensors, an approach determination portion, a collision determination portion, and a braking determination portion. The approach determination portion determines whether a vehicle and an object are approached based on an output signal of one of the approach sensors, and generates a first information as a determination result of the approach determination portion. The collision determination portion determines whether the vehicle collides with the object based on an output signal of at least one of the collision detection sensors, and generates a second information as a determination result of the collision determination portion. The braking determination portion determines whether the vehicle is braked based on the first information of the approach determination portion and the second information of the collision determination portion.

According to the vehicle control apparatus in the present disclosure, without increasing a sensitivity of an approach sensor, it is possible to determine whether the vehicle is braked or not in a case where there is a jump out or the like, which only by a single approach sensor detects, the single approach sensor detects an approach of an object, and the vehicle collides with the object. In other words, according to the present disclosure, in order to prevent a run-over accident of a vulnerable road user, it may be possible to precisely determine whether the vehicle is braked or not.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
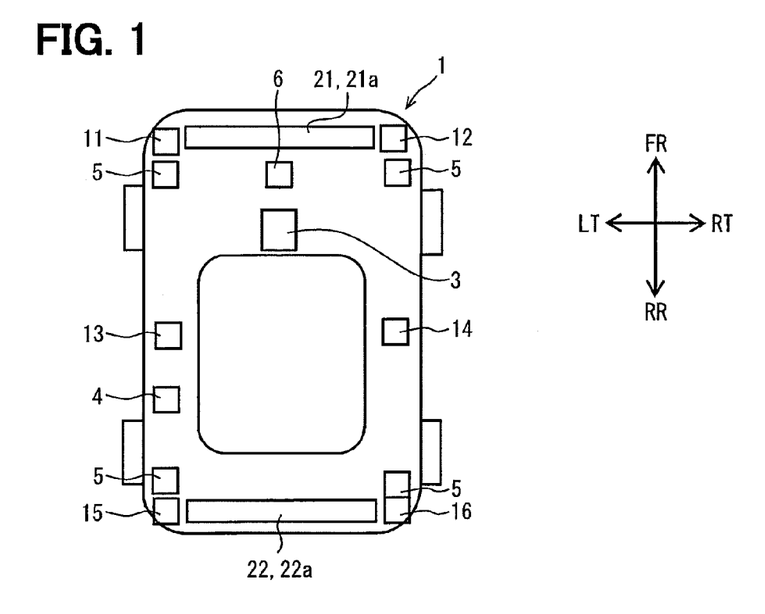
FIG. 1 is a drawing illustrating a configuration of a vehicle control apparatus in a first embodiment.
Figure 2:
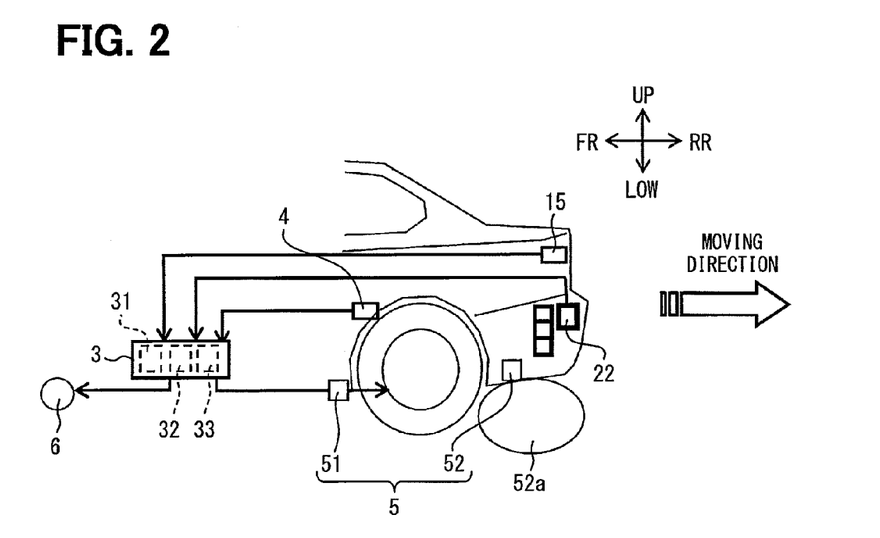
FIG. 2 is a drawing illustrating a configuration of the vehicle control apparatus in the first embodiment.

The embodiments of the present disclosure will be explained with referring to the drawings. Incidentally, an identical or similar part in each embodiment will have an identical symbol between embodiments. FIG. 1 is a plan view schematically illustrating a configuration of a vehicle control apparatus from the above of the vehicle 1. FIG. 2 is a partial conceptional drawing illustrating a vehicle rear part for illustrating the configuration of the vehicle control apparatus.

First Embodiment

As described in FIG. 1 and FIG. 2, a vehicle control apparatus in the first embodiment includes approach sensors 11-16, collision detection sensors 21, 22, a control ECU 3, a vehicle speed sensor 4, a run-over prevention device 5, and a warning device 6. The approach sensors 11-16 detect whether a vehicle 1 and an object are approached each other or not.

The approach sensors 11-16 are disposed to the vehicle 1 and are connected to the control ECU 3. The approach sensors 11-16 in the first embodiment correspond to a clearance sonar (e.g. an ultrasonic sensor), which generates a signal when the vehicle 1 approaches the object. The approach sensor 11 is disposed to a vehicle front left, the approach sensor 12 is disposed to a vehicle front right, the approach sensor 13 is disposed to a vehicle center left, the approach sensor 14 is disposed to a vehicle center right, the approach sensor 15 is disposed to a vehicle rear left, and the approach sensor 16 is disposed to a vehicle rear right.

The collision detection sensors 21, 22 detect a collision between the vehicle 1 and the object. The collision detection sensors 21, 22 are disposed to the vehicle 1 and connected to the control ECU 3. The collision detection sensors 21, 22 in the present embodiment correspond to chamber-type pressure sensors. The collision detection sensors 21, 22 generate a signal when a pressure in chamber members 21a, 22a changes. The chamber-type pressure sensor is a pedestrian collision detection sensor for detecting a collision with a pedestrian, and is used as a collision detection sensor of a vehicle control device in the present embodiment. The collision detection sensor 21 is disposed to a vehicle front, and the collision detection sensor 22 is disposed to a vehicle rear. The vehicle front corresponds to, for example, the inside of a bumper cover, and the vehicle rear corresponds to, for example, the inside of a bumper cover. The vehicle speed sensor 4 measures a speed of the vehicle 1, and is disposed to the inside of the vehicle 1. The vehicle speed sensor 4 sends a result of a measurement as a third information to the control ECU 3. Thus, the third information corresponds to information with respect to a vehicle speed.

The control ECU 3 corresponds to an electronic control unit disposed to the vehicle 1, and the control ECU 3 includes an approach determination portion 31, a collision determination portion 32, and a braking determination portion 33 as functions. The approach determination portion 31 determines whether the vehicle 1 and the object are approached based on signals from the approach sensors 11-16. The approach determination portion 31 stores a threshold. The approach determination portion 31 determines that the vehicle 1 and the object are approached when the approach determination portion 31 receives the signal from one of the approach sensors 11-16 and the signal exceeds the threshold. The approach determination portion 31 sends a determination result as a first information to the braking determination portion 33. In the first embodiment, the first information represents that the vehicle 1 and the object are approached (that is, a possibility of a collision may be high or increased). Incidentally, the vulnerable road user corresponds to a pedestrian or the like.

The first information is generated and sent from each approach sensor 11-16, which detect the object. That is, when two different approach sensors 11-16 detect an approach, two first information are sent to the braking determination portion 33. The approach determination portion 31 sends the first information to the braking determination portion 33 and operates the warning device 6 when the approach determination portion 31 receives the signal from at least one of the approach sensors 11-16.

The collision determination portion 32 determines whether the vehicle 1 and the object have collided based on the signal from at least one of the collision detection sensors 21, 22. This determination process may be referred to as a collision determination. The collision determination portion 32 stores a threshold (corresponding to a determination threshold) that is set up for each of the collision detection sensors 21, 22. The collision determination portion 32 determines that the vehicle 1 and the object have collided when the signal from the collision detection sensors 21, 22 exceed the thresholds. The collision determination portion 32 sends a determination result as a second information to the braking determination portion 33. In the first embodiment, the collision determination portion 32 sends the second information to the braking determination portion 33 when the collision determination portion 32 determines with the collision. The second information represents that the vehicle 1 and the object have collided each other. The second information includes information for specifying which of the collision detection sensors 21, 22 has detected the collision.

In the present embodiment, the collision determination portion 32 changes the threshold based on third information from the vehicle speed sensor 4. Specifically, when the vehicle speed is lower than a predetermined value (that is, the vehicle 1 travels at low speed), the collision determination portion 32 reduces the threshold smaller than a reference value.

The braking determination portion 33 determines whether the vehicle 1 is braked or not based on the first information and the second information, which are received. The braking determination portion 33 confirms whether the second information is received after receiving one first information in a case where the one first information is received. The braking determination portion 33 determines that the vehicle 1 is braked when the braking determination portion 33 receives the one first information and the second information.

The braking determination portion 33 confirms whether another first information is received after receiving the one first information. The braking determination portion 33 determines that the vehicle 1 is braked when the braking determination portion 33 receives the two first information in addition to the above case where the braking determination portion 33 receives the one first information and the second information. When the braking determination portion 33 does not receive the second information or another first information within a predetermined time after receiving the first information, the braking determination portion 33 determines that the vehicle 1 is not braked (that is, it is unnecessary to brake the vehicle 1 positively).

Figure 3:
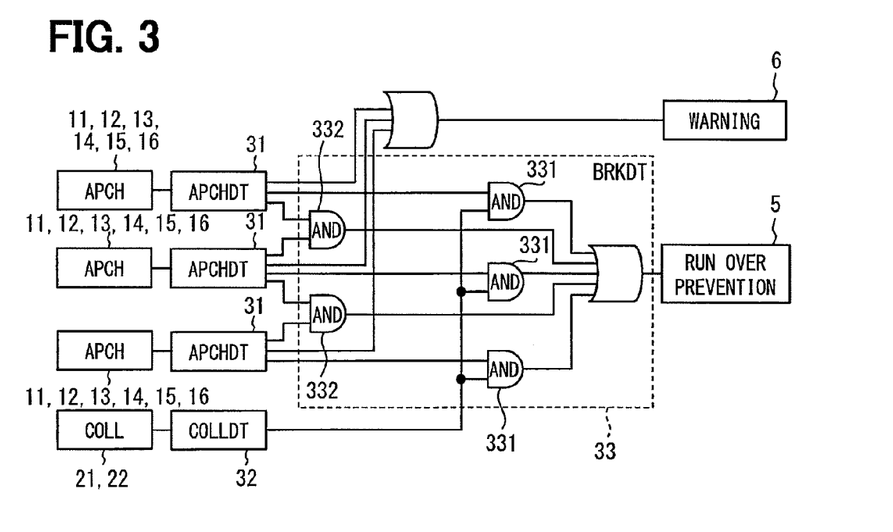
FIG. 3 is a drawing explaining a control of the vehicle control apparatus in the first embodiment.

The braking determination portion 33 includes an AND circuit 331 and an AND circuit 332 as described in FIG. 3 when a control of the braking determination portion 33 is explained using a logical circuit. The AND circuit 331 receives the one first information and the second information as an input. The AND circuit 332 receives the one first information and another first information as an input. When the AND circuits 331, 332 generate an output, the braking determination portion 33 determines that the vehicle 1 is braked. When the braking determination portion 33 determines that the vehicle 1 is braked, the braking determination portion 33 drives the run-over prevention device 5.

The run-over prevention device 5 is a device for preventing a run-over accident. The run-over accident corresponds to, for example, an accident in which an object (e.g. a vulnerable road user) and a vehicle collide each other and the object is caught between the vehicle and the ground, a wall, or the like. The run-over prevention device 5 may referred to as a run-over prevention device. The run-over prevention device 5 includes at least one of a brake device 51 and an inclusion prevention device 52. The brake device 51 brakes a wheel of the vehicle 1, and is also used during a normal travelling. The brake device 51 automatically operates the brake device 51 regardless of an operation amount of a brake pedal and executes an emergency brake when the brake device 51 receives an operation signal from the braking determination portion 33. The brake device 51 is configured from at least one of a hydraulic brake and a regeneration brake.

The inclusion prevention device 52 is disposed to at least one of a vehicle front lower part and a vehicle rear lower part, and deploys an air bag 52a between a lower part of the vehicle 1 and ground (or a wall) for preventing an involvement of the object (e.g. the vulnerable road user). The air bag 52a is disposed to deploy in front of a front tire when disposed at the vehicle front. The air bag 52a is disposed to deploy behind a rear tire when disposed at the vehicle rear.

The warning device 6 performs an attention attraction to a driver, and includes at least one of a warning light and a warning sound generator. The warning device 6 operates when the warning device 6 receives a signal (corresponding to the first information) from the approach determination portion 31. The warning device 6 in the present embodiment includes the warning light arranged in the vehicle 1, and the braking determination portion 33 causes the warning light to turn on by a receiving of the one first information.

Figure 4:
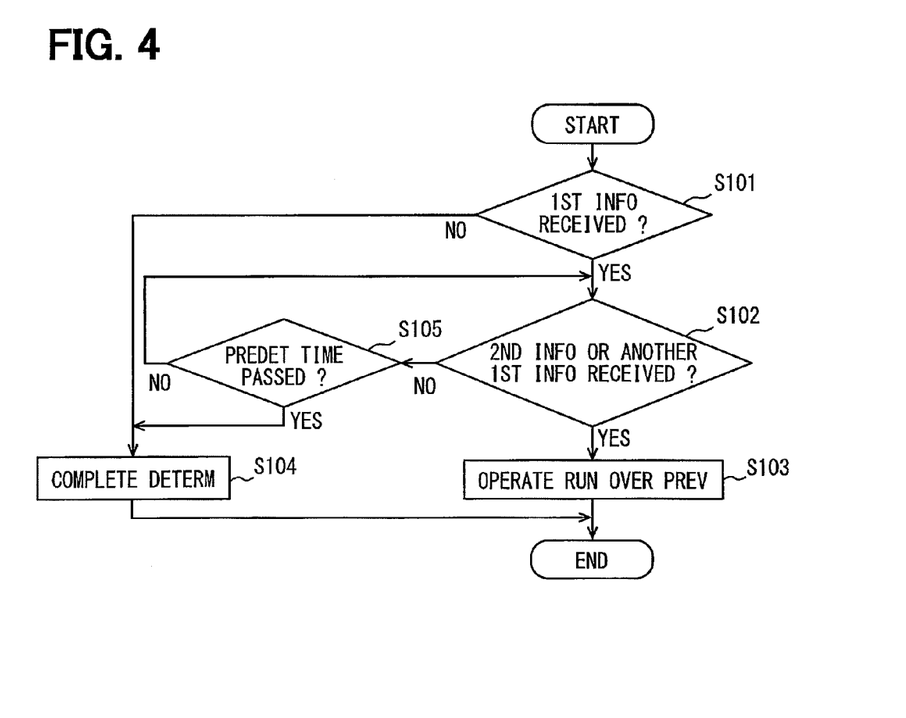
FIG. 4 is a flow chart illustrating a flow of the control of the vehicle control apparatus in the first embodiment.

FIG. 4 illustrates a flow of a control in the first embodiment. Initially, it is determined whether the first information is received or not (S101). When the control ECU 3 receives the first information (S101: YES), it is determined whether the second information or another first information is received or not (S102). When the second information or another first information is not received (S102: NO), the processing moves to S105. When it is determined that the predetermined time is not passed after receiving the first information (S105: NO), the processing returns to S102. When the control ECU 3 receives the first information (S101: YES) and the second information or another first information is received within the predetermined time (S102: YES), it is determined that the vehicle is braked and the run-over prevention device 5 is operated (S103). When the control ECU 3 does not receive the first information (S101: NO), it is determined that the vehicle 1 is not braked and the determination completes (S104). When the predetermined time after receiving the first information is passed (S105: YES), it is determined that the vehicle 1 is not braked and the determination is completed (S104).

According to the first embodiment, based on the first information, which is generated in a case where one of the approach sensors 11-16 detects the object, and the second information, which is generated in a case where one of the collision detection sensors 21, 22 detects the object, it is determined whether the vehicle 1 is braked or not. Therefore, according to the first embodiment, it is possible to determine that the vehicle 1 is braked even when the vulnerable road user exists at a position where only one approach sensor detects the vulnerable road user and the vulnerable road user contacts the vehicle 1 such as a case where the vulnerable road user dashes to a vehicle movement direction or the like. Since it is possible that the vehicle control apparatus in the first embodiment determines that the vehicle 1 is braked, it is possible to operate the run-over prevention device 5 when it is determined that the vehicle 1 is braked, and to reduce a run-over accident.

According to the first embodiment, it is possible to surely determine whether the braking of the vehicle is required or not as described above without increasing the number of the approach sensors or a sensitivity of the approach sensors, or without reducing a threshold of an approach determination in the approach sensors. Therefore, an excessive braking control is not occurred in the first embodiment, and a comfortable vehicle traveling may not be interfered. According to the first embodiment, it is possible to respond to a jump out or the like without the excessive control, and it is possible to precisely determine whether the vehicle 1 is braked or not.

According to the first embodiment, the threshold of the collision determination portion 32 is changed according to the vehicle speed. For example, in a case of the low speed traveling, an intensity of a collision falls. In the present embodiment, the threshold is reduced, and therefore, it is possible to shorten a time to determine with the collision. That is, the threshold is changed to a suitable value according to the vehicle speed and therefore, it is possible to prevent a time required for the collision determination from lengthening even when the intensity of the collision is reduced.

According to the first embodiment, since a requirement of the braking is determined precisely, and in addition, since the run-over prevention device 5 is operated, it may be possible to prevent an occurrence of the run-over accident. That is, when it is determined that the vehicle 1 is braked, the brake device 51 executes the emergency brake so that the vehicle 1 is braked to stop. In addition, the air bag 52a of the inclusion prevention device 52 is deployed and it is prevented the vulnerable road user from entering between a floor of the vehicle 1 and the ground (or a wall). Accordingly, it may be possible to reduce the occurrence of the run-over accident automatically without relying on an operation of the driver.

Second Embodiment

Figure 5:
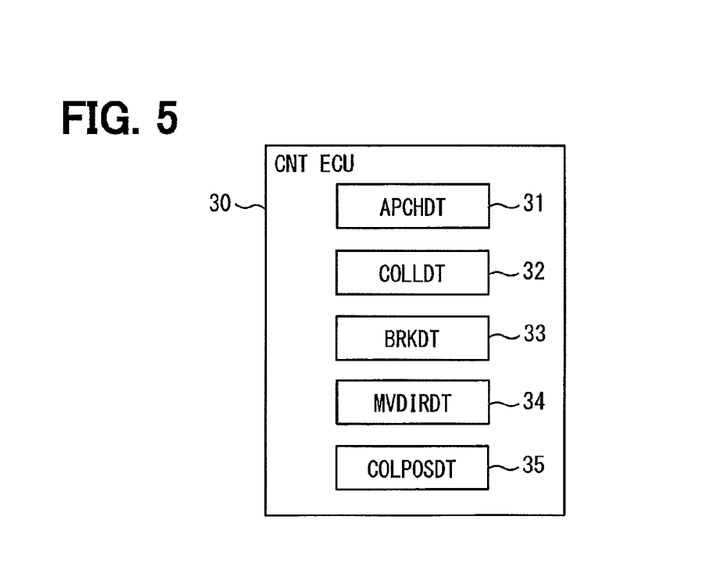
FIG. 5 is a drawing illustrating a configuration of a control ECU of a vehicle control apparatus in a second embodiment.

The vehicle control apparatus in the second embodiment further includes a moving direction determination portion 34 and a collision position determination portion 35 in the control ECU 3 (30) compared with the first embodiment. The braking determination portion 33 in the vehicle control apparatus performs a determination based on information from the moving direction determination portion 34 and the collision position determination portion 35. The difference between the first embodiment and the second embodiment will be explained especially. Incidentally, the identical symbols with the first embodiment represent the similar configuration in the first embodiment, and the described explanations will be referred.

The control ECU 30 in the second embodiment includes the approach determination portion 31, the collision determination portion 32, the braking determination portion 33, the moving direction determination portion 34, and the collision position determination portion 35 as functions as illustrated in FIG. 5.

The moving direction determination portion 34 determines a traveling direction of the vehicle 1 using at least one of position information of a shift gear, information (corresponding to the vehicle speed information) from the vehicle speed sensor 4, and steering angle information (corresponding to angle information of a steering wheel). Incidentally, the position information of a shift gear may represent a setting status (for example, P, D, 2, 1, R) of a transmission. The control ECU 30 receives the position information of the shift gear from a position sensor of the shift gear or another ECU, and receives the steering angle information from a steering wheel angle sensor or another ECU.

The moving direction determination portion 34 determines a forward-backward direction based on the position information of the shift gear (for example, P, D, 2, 1, R). Specifically, the moving direction determination portion 34 determines a moving direction of the vehicle 1 corresponds to a forward direction when the position of the shift gear corresponds to a forward direction (e.g. D, 2, 1), and determines the moving direction corresponds to a backward direction when the position of the shift gear corresponds to a backward direction (e.g.

R) The moving direction determination portion 34 sends the determination result as fourth information to the collision determination portion 32 and the braking determination portion 33.

The collision position determination portion 35 determines a collision position in the vehicle 1 based on the second information. The collision position determination portion 35 stores arrangement position information of the collision detection sensors 21, 22. The collision determination portion 32 sends the second information to the collision position determination portion 35 in addition to the braking determination portion 33. The collision position determination portion 35 compares the information for specifying the collision detection sensors 21, 22, which have detected the collision, among the received second information and the arrangement position information of the collision detection sensors 21, 22, and determines the collision position in the vehicle 1. That is, when the sensor detecting the collision corresponds to the collision detection sensor 21, the collision position determination portion 35 determines the collision position corresponds to a vehicle front, and when the sensor detecting the collision corresponds to the collision detection sensor 22, the collision position determination portion 35 determines the collision position corresponds to a vehicle rear. The collision position determination portion 35 sends the determination result (corresponding to collision position information) as fifth information to the braking determination portion 33. The fifth information includes an arrangement position information of the collision detection sensors 21, 22, which have detected the collision.

The collision determination portion 32 in the second embodiment changes the threshold based on the fourth information. Specifically, the collision determination portion 32 reduces the threshold for a signal of the collision detection sensor 21 and increases the threshold for a signal of the collision detection sensor 22 when the moving direction corresponds to the forward direction. The collision determination portion 32 increases the threshold for a signal of the collision detection sensor 21 and reduces the threshold for a signal of the collision detection sensor 22 when the moving direction corresponds to the backward direction.

The braking determination portion 33 in the second embodiment determines whether the vehicle 1 is braked based on the first information, the second information, the fourth information, and the fifth information. Specifically, the braking determination portion 33 compares the moving direction information of the fourth information and the collision position information of the fifth information when the braking determination portion 33 receives the first information and the second information, and the braking determination portion 33 determines that the vehicle 1 is braked when the moving direction information is matched with the collision position information. For example, it is supposed that the moving direction in the fourth information suggests the forward direction and the collision position in the fifth information suggests the vehicle front part. In this case, the braking determination portion 33 determines that the both results are matched and determines that the vehicle 1 is braked. For example, it is supposed that the moving direction in the fourth information suggests the forward direction and the collision position in the fifth information suggests the vehicle rear part. In this case, the braking determination portion 33 determines that the vehicle 1 is not braked irrespective of receiving the first information and the second information.

Figure 6:
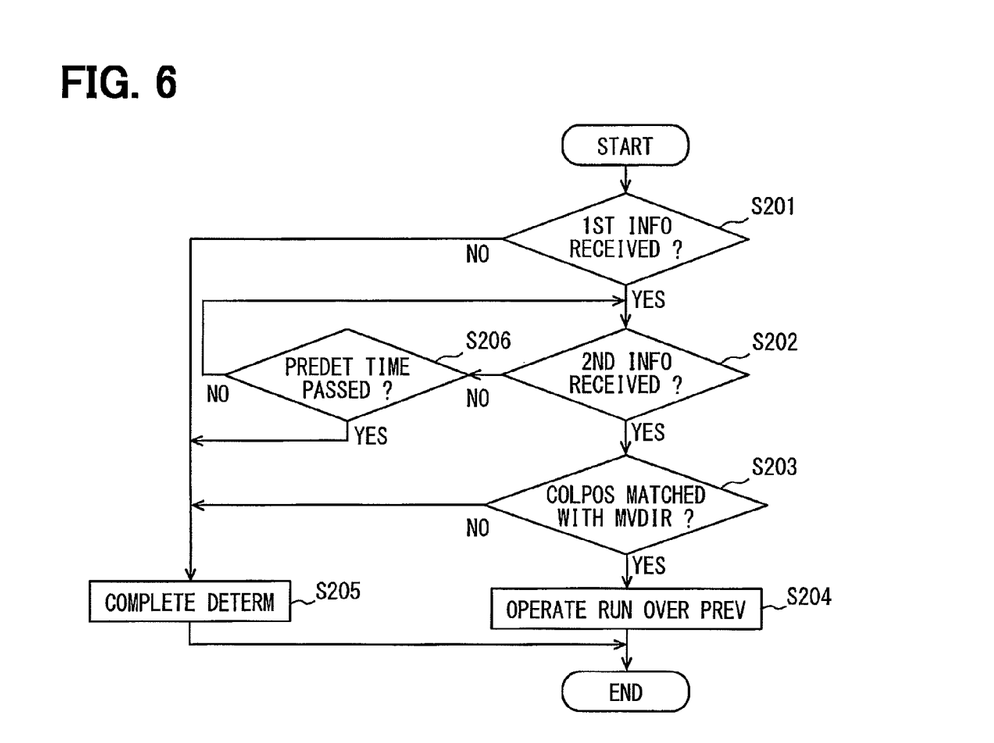
FIG. 6 is a flow chart illustrating a flow of a control of the vehicle control apparatus in the second embodiment.

FIG. 6 illustrates a flow of a control in the second embodiment. Initially, it is determined whether the first information is received or not (S201). When the control ECU 30 receives the first information (S201: YES), it is determined whether the second information is received or not (S202). When the control ECU 30 does not receive the second information (S202: NO), the processing moves to S206. At S206, when it is determined that the predetermined time is not passed after receiving the first information (S206: NO), the processing moves to S202. When the control ECU 30 receives the second information (S202: YES), it is determined whether the moving direction and the collision position of the vehicle 1 are the same based on the fourth information and the fifth information (S203). When the moving direction and the collision position are the same (S203: YES), it is determined that the vehicle 1 is braked and the run-over prevention device 5 is operated (S204). When the control ECU 30 does not receive the first information (S201: NO), it is determined that the vehicle 1 is not braked and the determination is completed (S205). When the predetermined time is passed after receiving the first information (S206: YES), it is determined that the vehicle 1 is not braked and the determination is completed (S205). When the moving direction and the collision position are not the same (S203: NO), it is determined that the vehicle 1 is not braked and the determination is completed (S205).

When the moving direction of the vehicle 1 and the collision position are not the same, that is, when the moving direction corresponds to the forward direction and the collision position corresponds to the vehicle rear, or when the moving direction corresponds to the backward direction and the collision position corresponds to the vehicle front, the run-over accident with the object may not occur even when the vehicle moves to the moving direction. In the second embodiment, since it is determined that the vehicle 1 is braked when the moving direction of the vehicle 1 and the collision position are the same (that is, when the moving direction of the vehicle 1 and the collision position are matched), it is possible to prevent an operation of an unnecessary braking. That is, according to the second embodiment, it is possible to increase a reliability of the determination and to determine a requirement of the braking more precisely.

The collision determination portion 32 changes each threshold according to the moving direction of the vehicle 1. Accordingly, it is possible that a sensitivity of a collision detection in the forward direction is increased and a sensitivity of the collision detection in the backward direction is reduced when the vehicle 1 moves to the forward direction. On the contrary, it is possible that a sensitivity of a collision detection in the backward direction is increased and a sensitivity of the collision detection in the forward direction is reduced when the vehicle 1 moves to the backward direction. Therefore, according to the second embodiment, it may be possible to detect the collision according to the moving direction of the vehicle 1.

Third Embodiment

A vehicle control apparatus in a third embodiment is different in a point that the collision determination portion 32 determines the collision based on the fourth information. A part different from the first embodiment and the second embodiment will be explained. The collision determination portion 32 stop the determination based on the signal from the collision detection sensor against to the moving direction represented by the fourth information. Specifically, when the moving direction of the fourth information corresponds to the forward direction, the collision determination portion 32 does not determine the collision based on the signal from the collision detection sensor 22, which is disposed to the vehicle rear part. When the moving direction of the fourth information corresponds to the backward direction, the collision determination portion 32 does not determine the collision based on the signal from the collision detection sensor 21, which is disposed to the vehicle front part.

The collision determination portion 32 determines the collision based on the signal of the collision detection sensor disposed to the same side as the moving direction. Accordingly, when the barking is unnecessary such as, for example, when the vehicle 1 moves to the forward direction and a collision occurs at the vehicle rear part, it is possible to prevent from determining that the vehicle 1 is braked. That is, it is possible to perform the determination according to an actual situation, to reduce an erroneous determination, and to improve the reliability of the determination.

Modification

It should be noted that the present disclosure is not limited to the present embodiment. For example, the moving direction determination portion 34 may determine a right-left direction of the moving direction based on the steering angle information. The moving direction determination portion 34 may determine a forward-backward direction of the moving direction based on information of the vehicle speed sensor 4. The moving direction determination portion 34 may determine the moving direction based on a combination of at least two of the position information of the shift gear, the information of the vehicle speed sensor 4, and the steering angle information.

For example, the moving direction determination portion 34 may determine the forward-backward direction based on the position information of the shift gear, and in addition, may determine the right-left direction based on the steering angle information. The moving direction determination portion 34 may determine an straight advancing direction, a left direction or a right direction with respect to the moving direction based on the steering angle information. The moving direction determination portion 34 may determine the moving direction based on the determination result of the forward-backward direction and the determination result of the right-left direction. For example, when a position of the shift gear corresponds to the forward direction and the steering angle corresponds to a left side, the moving direction corresponds to a front left.

The threshold of the approach determination portion 31 may be changed based on the fourth information. That is, the approach determination portion 31 may reduce the threshold at the same side as the moving direction and may increase the threshold against the moving direction. For example, when the moving direction corresponds to the forward direction, the threshold for the signal of the approach sensors 11, 12 may be reduced, and the threshold to the signals of the approach sensors 15, 16 may be increased. In addition, more finely, when the moving direction corresponds to the front right, the threshold to the signal of the approach sensor 12 may be reduced. Accordingly, it is possible to detect the approach of the vulnerable road user to the moving direction quickly.

In addition, it is possible that the collision position determination portion 35 performs the determination for braking using collision position information in a case where the collision detection sensors 21, 22 enable to determine where the object collides, for example, in a case where the multiple chambers configures a pair of chamber in the collision detection sensors 21, 22. In addition, the collision position determination portion 35 may determine the collision position based on the arrangement position information of the collision detection sensors 21, 22 and arrangement position information of the approach sensors 11-16.

The run-over prevention device 5 may be configured from each of the brake device 51 and the inclusion prevention device 52, and may include the warning device 6. The braking determination portion 33 may determine whether the vehicle 1 is braked or not and determine whether the inclusion prevention device 52 is deployed or not. The inclusion prevention device 52 may be disposed to the vehicle front and the vehicle rear or disposed to each tire. The inclusion prevention device 52 at the same side as the collision position may be deployed according to the collision position. Accordingly, it is possible to prevent an unnecessary deployment of the air bag 52a.

In addition, the approach sensors 11-16 may be an image sensor. The collision detection sensors 21, 22 may be the chamber-type pressure sensor, a G sensor (an acceleration sensor), a load sensor, or any combination of the chamber-type pressure sensor, the G sensor (an acceleration sensor), the load sensor. Incidentally, in the present disclosure, the determination whether the vehicle 1 is braked or not may be referred to as a determination whether a run-over prevention device is operated or not. In other words, the determination whether a run-over prevention device is operated or not may corresponds to a necessity or not of the positive control.

According to one aspect of the present disclosure, a vehicle control apparatus includes one or more approach sensors, one or more collision detection sensors, an approach determination portion, a collision determination portion, and a braking determination portion. The approach determination portion determines whether a vehicle and an object are approached based on an output signal of one of the approach sensors, and generates a first information as a determination result of the approach determination portion. The collision determination portion determines whether the vehicle collides with the object based on an output signal of at least one of the collision detection sensors, and generates a second information as a determination result of the collision determination portion. The braking determination portion determines whether the vehicle is braked based on the first information of the approach determination portion and the second information of the collision determination portion.

According to the vehicle control apparatus in the present disclosure, without increasing a sensitivity of an approach sensor, it is possible to determine whether the vehicle is braked or not in a case where there is a jump out or the like, which only by a single approach sensor detects, the single approach sensor detects an approach of an object, and the vehicle collides with the object. In other words, according to the present disclosure, in order to prevent a run-over accident of a vulnerable road user, it may be possible to precisely determine whether the vehicle is braked or not.

It is noted that a flowchart or a processing of the flowchart in the present application includes steps (also referred to as sections), each of which is represented, for example, as S101. Further, each step may be divided into several sub-steps, and several steps may be combined into a single step.

Each or any combination of steps explained in the above embodiments may be achieved as (i) a software steps in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle control apparatus comprising:
at least one approach sensor;
at least one collision detection sensor;
an approach determination portion determining whether a vehicle and an object are approached based on an output signal of the at least one approach sensor, and generating a first information as a determination result of the approach determination portion;
a collision determination portion determining whether the vehicle collides with the object based on an output signal of the at least one collision detection sensor, and generating a second information as a determination result of the collision determination portion;
a braking determination portion determining whether the vehicle is to be braked based on the first information of the approach determination portion and the second information of the collision determination portion;
a run-over prevention device preventing a run-over accident, wherein the braking determination portion operates the run-over prevention device based on a determination result of the braking determination portion determining whether the vehicle is to be braked;
the run-over prevention device includes at least one of a brake device and an inclusion prevention device, or
the run-over prevention device includes a warning device and at least one of the brake device and the inclusion prevention device;
the at least one collision detection sensor includes a plurality of collision detection sensors disposed to the vehicle; and
the collision determination portion stops a collision determination performed by a sensor of the collision detection sensors, which is disposed to an opposite side from a moving direction of the vehicle, based on a fourth information with respect to the moving direction of the vehicle.

2. The vehicle control apparatus according to claim 1, wherein
the collision determination portion stores a determination threshold determining whether the vehicle collides with the object, and
the collision determination portion changes the determination threshold based on a third information with respect to a vehicle speed.

3. The vehicle control apparatus according to claim 1, wherein
the braking determination portion determines whether the vehicle is to be braked based on the fourth information with respect to the moving direction of the vehicle.

4. The vehicle control apparatus according to claim 3, wherein
the fourth information includes at least one of a position information of a shift gear, a vehicle speed information, and a steering angle information.

5. The vehicle control apparatus according to claim 1, wherein
the collision determination portion stores a determination threshold determining whether the vehicle collides with the object, and
the collision determination portion changes the determination threshold based on the fourth information with respect to the moving direction of the vehicle.

6. The vehicle control apparatus according to claim 1, wherein
the braking determination portion determines whether the vehicle is to be braked based on a fifth information with respect to a collision position at which the vehicle has collided with the object.

7. The vehicle control apparatus according to claim 6, wherein
a plurality of collision detection sensors are disposed to the vehicle, and
the fifth information includes information of an arrangement position of a sensor of the collision detection sensors, which has detected a collision.

8. The vehicle control apparatus according to claim 1, wherein
the at least one approach sensor corresponds to an ultrasonic sensor or an image sensor.

9. The vehicle control apparatus according to claim 1, wherein
the at least one collision detection sensor corresponds to a pressure sensor, a load sensor, or an acceleration sensor.

10. The vehicle control apparatus according to claim 1, wherein
the collision determination portion executes the collision determination performed by a different sensor of the collision detection sensors, the different sensor being disposed to an identical side from the moving direction.

11. A vehicle control apparatus comprising:
at least one approach sensor;
at least one collision detection sensor;
an approach determination portion determining whether a vehicle and an object are approached based on an output signal of the at least one approach sensor, and generating a first information as a determination result of the approach determination portion;
a collision determination portion determining whether the vehicle collides with the object based on an output signal of the at least one collision detection sensor, and generating a second information as a determination result of the collision determination portion;
a braking determination portion determining whether the vehicle is to be braked based on the first information of the approach determination portion and the second information of the collision determination portion;
the at least one collision detection sensor includes a plurality of collision detection sensors disposed to the vehicle, and
the collision determination portion stops a collision determination performed by a sensor of the collision detection sensors, which is disposed to an opposite side from a moving direction of the vehicle, based on a fourth information with respect to the moving direction of the vehicle.

12. The vehicle control apparatus according to claim 11 further comprising
a run-over prevention device preventing a run-over accident, wherein
the braking determination portion operates the run-over prevention device based on a determination result of the braking determination portion determining whether the vehicle is to be braked.

13. The vehicle control apparatus according to claim 12, wherein
    the run-over prevention device includes at least one of a brake device and an inclusion prevention device, or
    the run-over prevention device includes a warning device and at least one of the brake device and the inclusion prevention device.

14. The vehicle control apparatus according to claim 11, wherein
    the collision determination portion executes the collision determination performed by a different sensor of the collision detection sensors, the different sensor being disposed to an identical side from the moving direction.

* * * * *